(12) United States Patent
Ogasawara et al.

(10) Patent No.: US 7,944,422 B2
(45) Date of Patent: May 17, 2011

(54) LIQUID CRYSTAL DISPLAY METER APPARATUS

(75) Inventors: Kazuyoshi Ogasawara, Shizuoka (JP); Hiroshi Kato, Aichi (JP)

(73) Assignee: Yazaki Corporation, Tokyo (JP)

( * ) Notice: Subject to any disclaimer, the term of this patent is extended or adjusted under 35 U.S.C. 154(b) by 681 days.

(21) Appl. No.: 11/637,882

(22) Filed: Dec. 13, 2006

(65) Prior Publication Data

US 2007/0146262 A1 Jun. 28, 2007

(30) Foreign Application Priority Data

Dec. 27, 2005 (JP) ................................. 2005-374782

(51) Int. Cl.
*G09G 3/36* (2006.01)
(52) U.S. Cl. ............................ 345/87; 345/156; 340/441
(58) Field of Classification Search .................... 345/87, 345/204, 156, 168, 169, 157; 340/441; 349/1
See application file for complete search history.

(56) References Cited

U.S. PATENT DOCUMENTS

| 5,949,346 A * | 9/1999 | Suzuki et al. ............ 340/815.45 |
| 6,556,180 B1 * | 4/2003 | Furuhashi et al. ............... 345/87 |
| 2003/0151614 A1 * | 8/2003 | Knee et al. .................... 345/619 |

FOREIGN PATENT DOCUMENTS

JP 2001-117074 4/2001

* cited by examiner

*Primary Examiner* — Stephen G Sherman
(74) *Attorney, Agent, or Firm* — Kratz, Quintos & Hanson, LLP

(57) ABSTRACT

The present invention is to provide a liquid crystal display (LCD) meter apparatus having a small influence of a residual image of a pointer. The LCD meter apparatus for displaying a dial plate and a pointer includes a moving-speed calculating device for calculating the moving-speed of the pointer; and an image density changing device for reducing the image density of the pointer responding to the moving-speed of the pointer calculated with the moving-speed calculating device. The image density of the pointer becomes thinner as the moving speed of the pointer becomes faster so that an erasing time of the image becomes shorter or a residual image remains shorter. Both residual and latest images are displayed thinly, the plurality of the images including the residual images do not give a noticeable appearance so that the LCD meter apparatus provides a clear view.

4 Claims, 10 Drawing Sheets

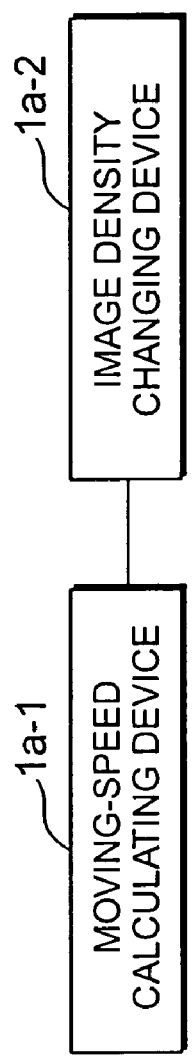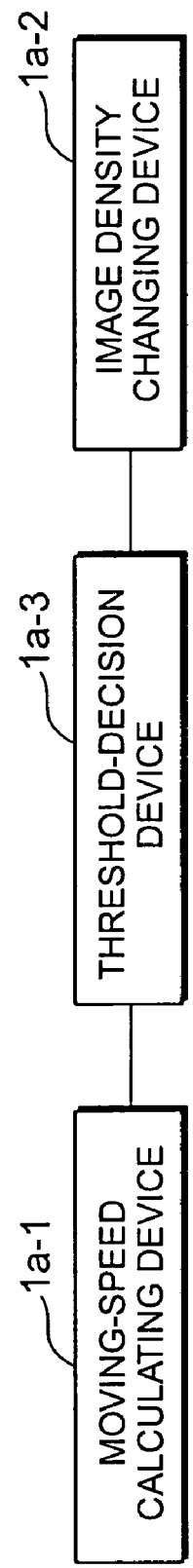
FIG. 1A
FIG. 1B

FIG. 5A  PRIOR ART

| SAMPLING DATA | A | B | C | D | ... |
|---|---|---|---|---|---|
| IMAGE DATA | A | B | C | D | ... |
| IMAGE DENSITY | 1 | 1 | 1 | 1 | ... |

FIG. 5B

| SAMPLING DATA | A | B | C | D | ... |
|---|---|---|---|---|---|
| IMAGE DATA | A | A | B | C | ... |
| DISPLAYING COORDINATE DIFFERENCE | 0 | \|A−B\| | \|B−C\| | \|C−D\| | ... |
| IMAGE DENSITY | 1 | 1−(\|A−B\|×K) | 1−(\|B−C\|×K) | 1−(\|C−D\|×K) | ... |

LIQUID CRYSTAL DISPLAY METER APPARATUS

BACKGROUND OF THE INVENTION

1. Field of the Invention

The present invention relates to a liquid crystal display (LCD) meter apparatus for displaying a dial plate and a pointer in an analog manner.

2. Description of Related Art

It is believed that a liquid crystal display (LCD) panel has a response speed slower than a CRT and has a difference about times to display a bright color and a dark color.

FIG. 9 illustrates the response speed of a general LCD panel. When the LCD panel displays an image moving faster than the response speed of the LCD panel, a following image is displayed on the LCD panel prior to disappearance of the previous image so that both images appear at the same time in the LCD panel. As shown in FIG. 9, a rise time T1 from the minimum luminance (black) to the maximum luminance (white) is different from a fall time T2 from the maximum luminance to the minimum luminance. The difference of the response speed responsive to the colors results in the several appearances and disappearances of the images.

The LCD panel is utilized for a speed meter of a vehicle or an LCD meter. The LCD meter displays a still image of a circular dial plate and a moving image of a pointer, which rotates and points in the dial plate responding to a running state of the vehicle. The moving image of the pointer is changed every T0 (=1/60 secs) in the display according to a sampling data of a period of time T0.

FIG. 10 shows a flowchart of processing the moving image of the pointer of a conventional LCD meter. At step S11, a rotation angle responsive to a speed signal is acquired. At step S12, a coordinate of the image on the LCD panel responsive to the rotation angle is calculated. At step S13, an image data of the pointer responsive to the coordination is read from a memory. At step S14, the image data from the memory is displayed on the LCD panel.

The LCD panel is utilized for the meter such as the speed meter of the vehicle. However, when the pointer is moved faster than the response speed of the LCD panel, a last image of the pointer appears on a latest image thereof prior to disappearance of the last image.

As shown in FIG. 11, when the LCD panel starts to display the latest image and at the same time to erase the last image, the last image remains with the latest image. An image density on the LCD panel is always constant (100%).

In this case, as shown in FIG. 12, both the last and latest images G12 and G13 of the pointers appear on the LCD panel. A second last image G11 happens to appear depending on the response speed of the LCD panel so that the plurality of the pointers appear and cause difficulty to identify the instant pointer. The arrows of FIG. 12 only illustrates a rotation direction of the pointer and are not shown in the real display.

JP,2001-117074 discloses a driving method of an LCD panel to solve the problem. The driving method includes a frame memory device for delaying one frame of a first image data inputted from an external apparatus, a calculating device for comparing the first image data with a second image data stored in the frame memory with one frame delayed, and an adjusting device for adjusting corrected data outputted from the calculating device to the first image data. The driving method adds the corrected data to the image data, which changes the state of the image, to speed up the response speed of the LCD panel.

The conventional method corrects the characteristics of the LCD panel to achieve a high speed response with a hardware. When the display panel driven is changed, it is required to change the correction method and the circuit. The conventional method is not versatile.

SUMMARY OF THE INVENTION

An object of the present invention is to provide a liquid crystal display meter apparatus having a small image lag of a pointer utilized for a speed meter.

According to a first aspect of the present invention, a liquid crystal display (LCD) meter apparatus for displaying a dial plate and a pointer, the LCD meter apparatus includes a moving-speed calculating device for calculating the moving-speed of the pointer; and an image density changing device for reducing the image density of the pointer responding to the moving-speed of the pointer calculated with the moving-speed calculating device.

According to a second aspect of the present invention, a liquid crystal display (LCD) meter apparatus for displaying a dial plate and a pointer, the LCD meter apparatus includes a moving-speed calculating device for calculating the moving-speed of the pointer; a decision device for determining whether the calculated moving-speed of the pointer is equal or higher than a threshold value; and an image density changing device for reducing the image density of the pointer responding to the moving-speed of the pointer calculated with the moving-speed calculating device.

Preferably, the image density changing device reduces the image density of the pointer to an extent of P=|moving speed|×K, where the K is a factor depending on a response speed of an LCD panel and image data of the pointer.

BRIEF DESCRIPTION OF THE DRAWINGS

FIG. 1A is a basic configuration of devices of a first embodiment of a liquid crystal display (LCD) meter apparatus;

FIG. 1B is a basic configuration of devices of a second embodiment of a liquid crystal display (LCD) meter apparatus;

FIG. 5A illustrates a relation among sampling data, image data, and image densities of the conventional LCD meter apparatus;

FIG. 5B illustrates a relation among sampling data, image data, and image densities of the LCD meter apparatus of the present invention;

DETAILED DESCRIPTION OF THE PREFERRED EMBODIMENTS

Figure 2:
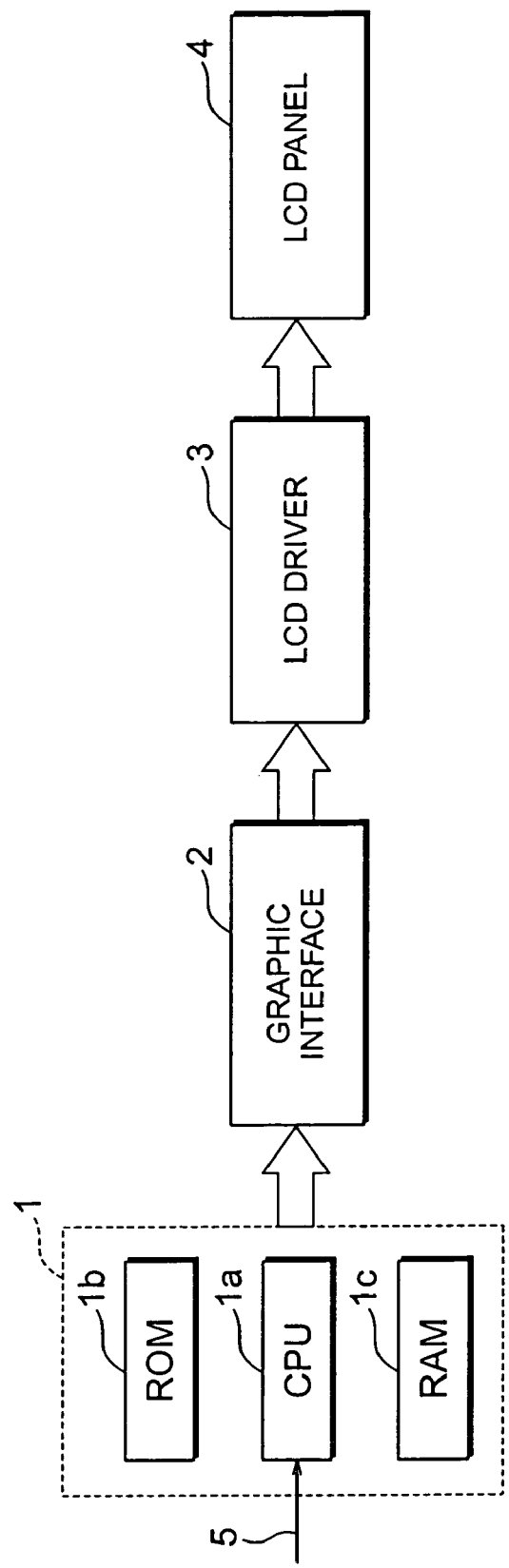
FIG. 2 is a block diagram of the first embodiment of the LCD meter apparatus.

An embodiment of the present invention is explained by referring to the drawings. The embodiment shows a liquid crystal display (LCD) meter apparatus utilized for a speed meter of a vehicle.

FIG. 1A shows a basic configuration of a first embodiment of an LCD meter apparatus of the present invention. The LCD meter apparatus includes a moving-speed calculating device 1$a$-1 and an image density changing device 1$a$-2.

FIG. 1B shows a basic configuration of a second embodiment of an LCD meter apparatus of the present invention. The LCD meter apparatus includes a moving-speed calculating device 1$a$-1, a threshold-decision device 1$a$-3, and an image density changing device.

FIG. 2 is a block diagram of the LCD meter apparatus of the first embodiment of the present invention. The LCD meter apparatus has a microcomputer 1, a graphic interface 2, an LCD driver 3, and an LCD panel 4.

The microcomputer 1 has a CPU 1$a$ for controlling devices and processing programs, a ROM 1$b$ for storing the programs for the CPU 1$a$, a RAM 1$c$ for storing several data and providing a processing area for the CPU 1$a$. The CPU 1$a$ has the moving-speed calculating device 1$a$-1 and the image density changing device 1$a$-2 as the programs for processing a flowchart of the first embodiment of the LCD meter apparatus. The POM 1$b$ has a first memory device for storing a still image of a dial plate of a circle-shaped speed meter and a plurality of image data of pointers responsive to angles of the pointers rotating on the dial plate. The ROM 1$b$ stores a threshold value of the moving speed as described below. The ROM 1$b$ has a second memory device.

The microcomputer 1 receives a signal of running speed of the vehicle through a data bus 5 and sends image data, which are received from the ROM 1$b$, to the LCD panel via the graphic interface 2 and the LCD driver 3 to display the image on the LCD panel 4.

The LCD panel 4 displays the still image of the circular dial plate and the pointer, which points scales on the dial plate responding to the running state of the vehicle. The dial plate has, for example, a black background and white scales or numerals, and the pointer is indicated with red color. The image of the pointer is changed every a unit of time T0 (=1/60 secs) with a rotation angle (pointer angle) sampled every the unit of time T0. The latest rotation angle data are stored in the RAM 1$c$ as a buffer memory and the pointer is displayed on the LCD panel based on the last rotation angle data. Although the image of the pointer on the LCD panel is delayed by 1/60 secs, it is impossible to realize this delay.

When the latest rotation angle data are acquired, the LCD panel shows the image of the pointer based on the last rotation angle data. In the present invention, prior to displaying the image of the pointer, a difference between the last rotation angle and the latest rotation angle is calculated every the unit of the sampling time and a difference between coordinates thereof responsive to the rotation angles is calculated and the image density of the pointer is changed with the moving speed of the pointer. More specifically, the image density of the pointer is 100% when the pointer is rest, and decreases from 100% when the moving speed of the pointer becomes faster and approaches to 100% when the moving speed becomes slow. A reduction of the image density is expressed with the following equation.

$$\text{Reduction of image density } P = |\text{moving speed}| \times K \quad (1)$$

where K is a factor depending on the response speed of the LCD panel and the image data of the pointer.

The image density is given by 1−P. Since an upper limit of the image density is 1 (the pointer is rest) and a lower limit is 0 (the pointer is too fast to see), (1−P) is in the range of 0-1 so that P is in the range of 0-1.

Figure 3:
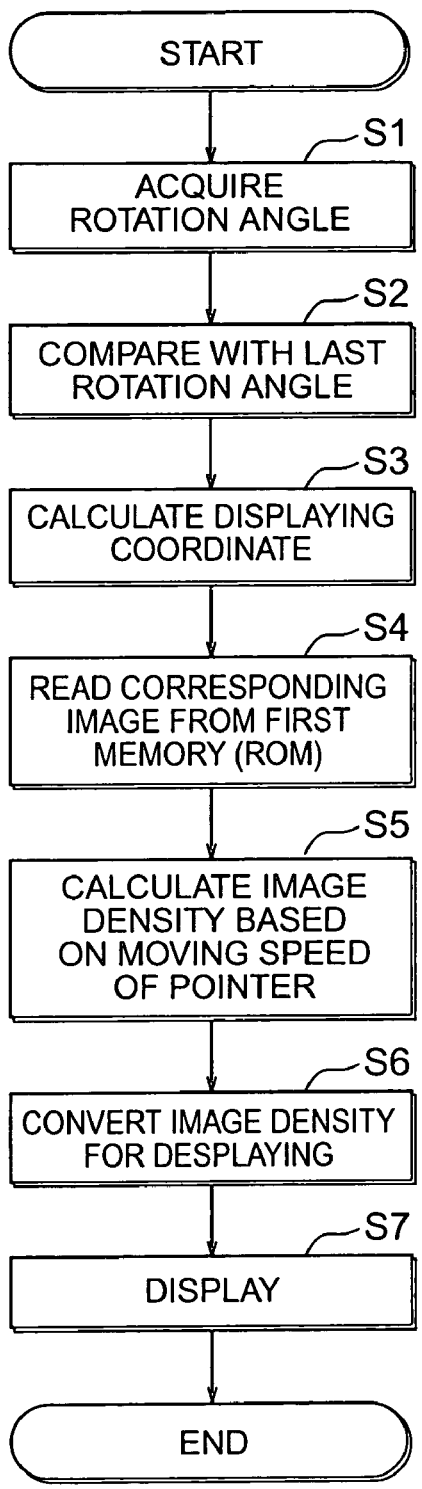
FIG. 3 is a flowchart of processing an imaging of a pointer executed with a CPU of the first embodiment of the LCD meter apparatus.

FIG. 3 is a flowchart processing an imaging of the pointer of a first embodiment of the LCD meter apparatus of the present invention. At step S1, the rotation angle of the pointer responsive to the running state of the vehicle is calculated from a running speed-signal inputted with a running speed sensor, not shown, from the data bus 5. The calculated or acquired rotation angle data are stored in the RAM 1$c$. The acquired rotation angle data at step S1 are compared with the rotational angle acquired last and stored in RAM 1$c$. At step S2, the difference between the last and latest rotation angles is calculated, and the result or a displaying coordinate difference (moving speed) is stored in the RAM 1$c$ as the moving speed of the pointer. At step S3, the displaying coordinate on the LCD panel 4 responsive to the last rotation angle data is calculated. At step S4, the corresponding image data of the pointer is read from the ROM 1$b$.

At step S5, the image color of the pointer is calculated based on the moving speed of the pointer stored in step S2. The reduction of the image density is proportional to the moving speed of the pointer as given in Eq. (1). The image density of the pointer is thus calculated from the equation of 1−P.

At step S6, the image density of the pointer is converted to the image density to be displayed on the LCD panel. At step S7, the converted image is displayed on the LCD panel.

Figure 4:
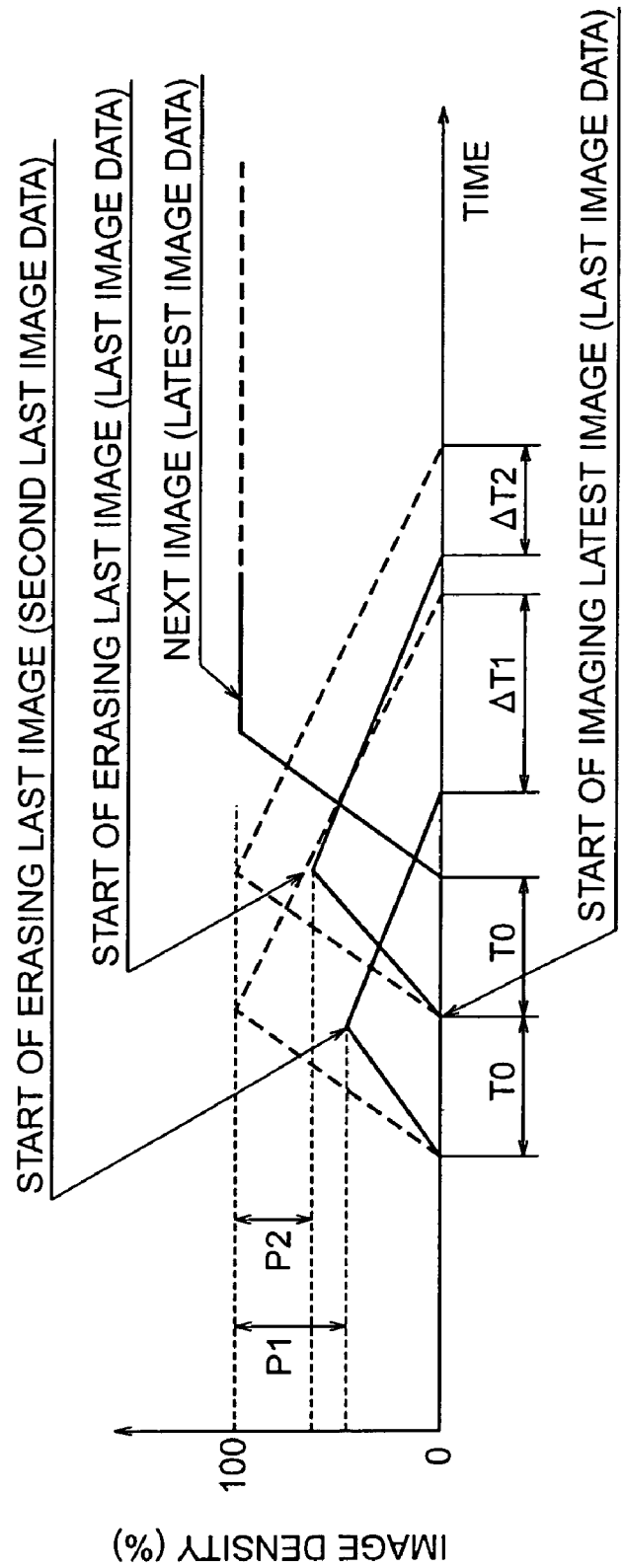
FIG. 4 illustrates an example of changing an image density of the pointer.

FIG. 4 shows an example of changes of the image densities of the pointers of the present invention. The last image density of the pointer based on the second last rotation angle data of the pointer is reduced by P1 calculated from the difference between the second last and the last rotation angles of the pointer. The reduction of the image density reduces the erasing time of the last image of the pointer by ΔT1 compared to the conventional art denoted by dotted lines. The latest image density of the pointer based on the last rotation angle data of the pointer is reduced by P2 calculated from the difference between the last and the latest rotation angles of the pointer. The reduction of the image density reduces the erasing time of the latest image of the pointer by ΔT2 compared to the conventional art denoted by dotted lines. As the moving speed of the pointer is faster, the reduction of the image density of the pointer becomes large and the erasing time becomes shorter.

FIG. 5A shows a relation among the sampling data, the image data, and the image density in the conventional apparatus. FIG. 5B shows a relation among the sampling data, the image data, the displaying coordinate difference, and the image density of the present invention. As shown in FIG. 5A, in the conventional apparatus, when the acquired sampling data are A, B, C, D, . . . , the image data are A, B, C, D, . . . so that the image density becomes always 1 (=100%).

Contrary to the conventional apparatus, in the LCD meter apparatus of the present invention, when the sampling data are from rest to moving, such as A, B, C, D, . . . , the image data are delayed by one sampling from the sampling data and become A, A, B, C, . . . . If the sampling data A is a state of rest and the sampling data B, C, D are states of moving faster than the threshold value, the first sampling data A is displayed as the image data A as in the conventional apparatus. In the present invention, the displaying coordinate differences (rotation angles) become 0, |A−B|, |B−C|, |C−D|, ... so that the respective image densities become 1(100%), 1−(|A−B|×K), 1−(|B−C|×K), 1−(|C−D|×K), ....

Figure 6:
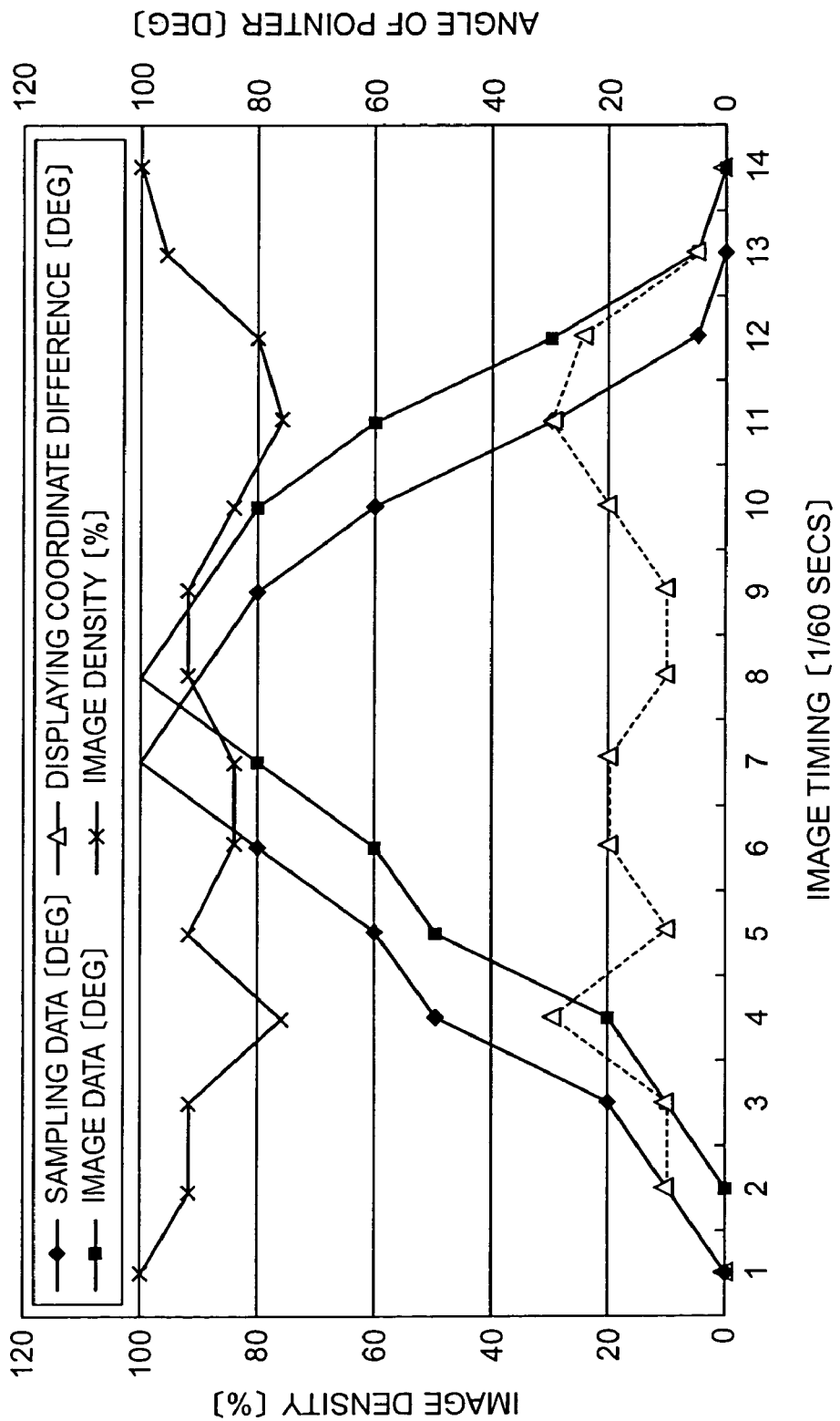
FIG. 6 is a graph showing the relation among the sampling data, the image data, displaying coordinate differences, and the image densities (%) of the LCD meter apparatus of the present invention.

FIG. 6 shows an example of a relation among the sampling data (degrees), the image data (degrees), the displaying coordinate differences (degrees), and the image densities (%) sampled 1-14 unit of timings of the present invention.

Figure 7:
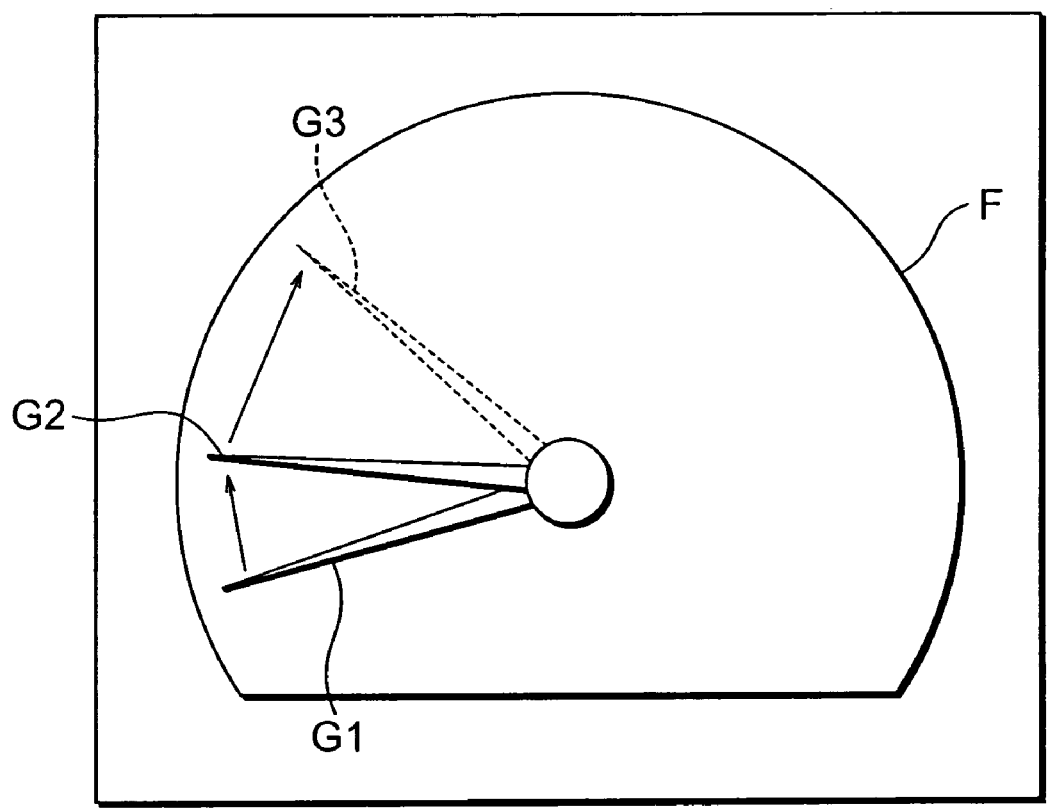
FIG. 7 is an example of the LCD panel showing a speed meter of the present invention.

As shown in FIG. 7, in the present invention, the dial plate of the LCD panel 4 shows the last image G1 of the pointer based on the image data of the second last sampling, the latest image G2 of the pointer based on the last image data, and the next image G3, shown in a dotted line, based on the image data of the latest image data. The arrows indicated in FIG. 7 are only for indicating the moving direction of the pointer and not actually shown. The respective image densities are G3>G2>G1.

The conventional apparatus displays the pointer with a constant image density regardless of the moving speed thereof so that the LCD meter apparatus displays the residual image when the moving speed is high. The LCD meter apparatus of the present invention reduces the image density of the pointer with the increase of the moving speed thereof so that the erasing time of the pointer moving with high speed becomes shorter (the residual image of the pointer remains shorter). Since both the residual image and the latest image of the pointer are displayed thinly, the plurality of the residual images do not give a noticeable appearance.

The apparatus of the present invention provides a natural image without utilizing a motion blur method, which utilizes more image data. The motion blur method thus adds more load to CPU and graphic IC. The apparatus of the present invention does not increase the image data so that the CPU load is quite small.

A second embodiment of an LCD meter apparatus of the present invention utilizes the same configuration of devices as the first embodiment shown in FIG. 2. The only difference of the second embodiment is an additional step in a flowchart.

Figure 8:
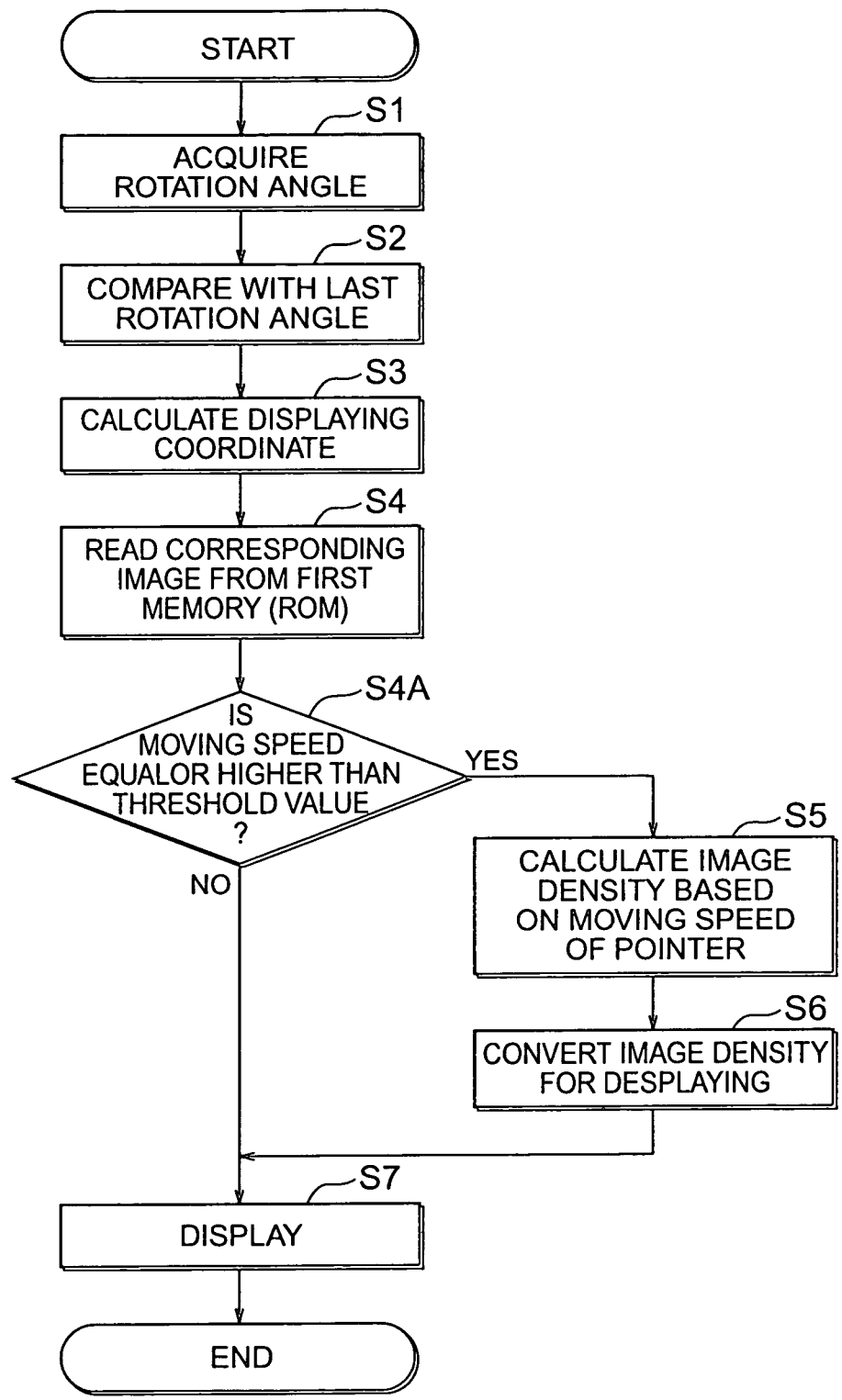
FIG. 8 is a flowchart of processing an imaging of a pointer executed with a CPU of a second embodiment of an LCD meter apparatus.
Figure 9:
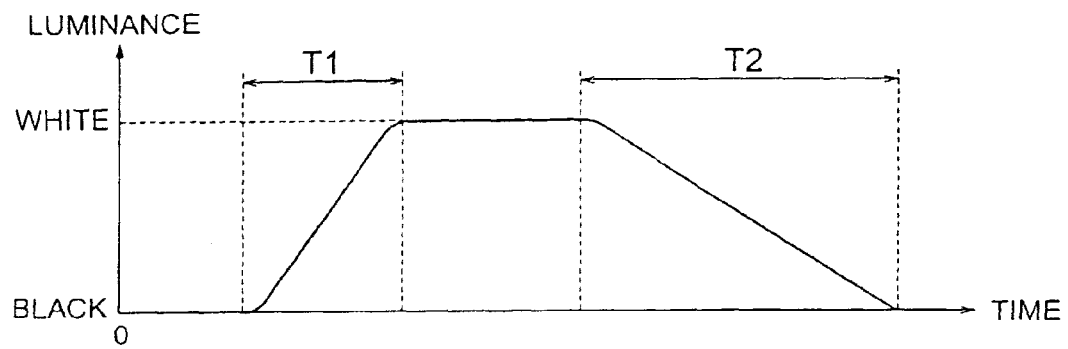
FIG. 9 illustrates a response speed of a general LCD panel.
Figure 10:
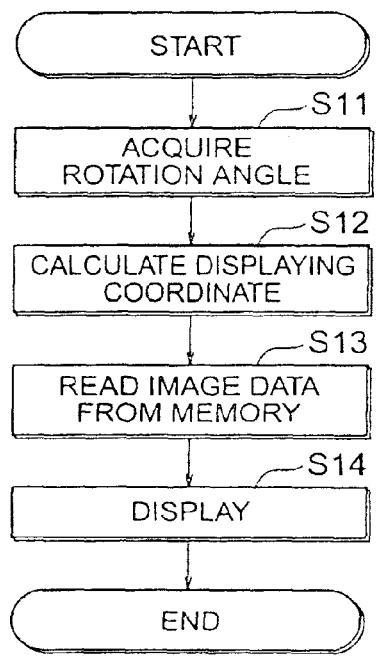
FIG. 10 is a flowchart of processing an imaging of a pointer of a conventional LCD meter apparatus.
Figure 11:
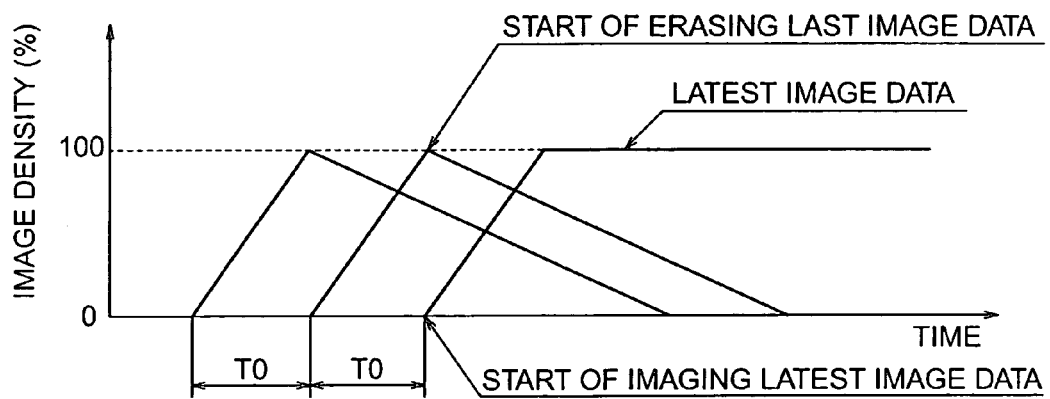
FIG. 11 illustrates an example of showing an image density of the pointer with the conventional LCD meter apparatus.
Figure 12:
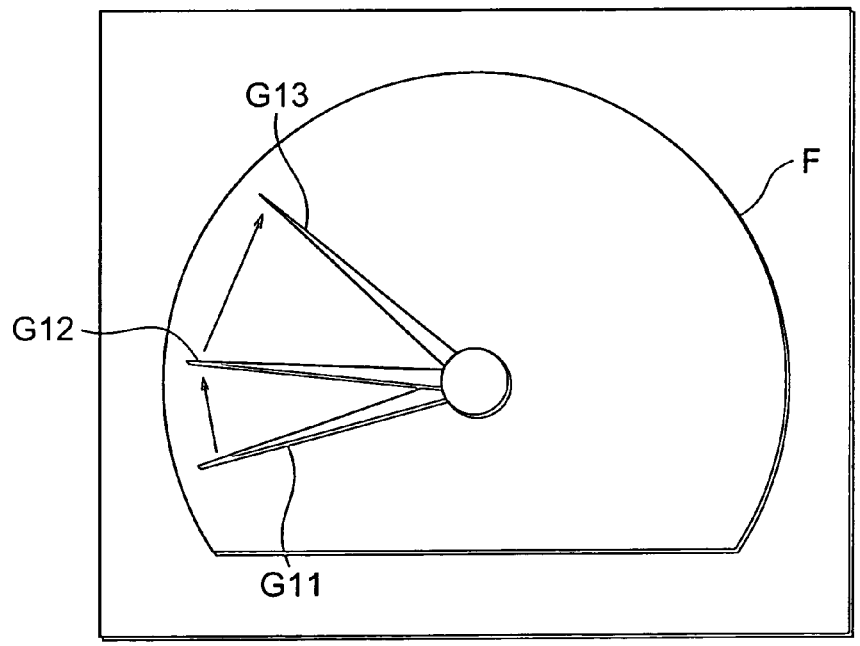
FIG. 12 is an example of the conventional LCD panel showing a speed meter.

FIG. 8 is a flowchart of processing an imaging of a pointer of the second embodiment of an LCD meter apparatus of the present invention. At step S1, a rotation angle of the pointer responsive to a running state of a vehicle is calculated from a running speed signal inputted with a running speed sensor, not shown, from a data bus 5. The calculated or acquired rotation angle data are stored in a RAM 1c. The acquired rotation angle data at step S1 are compared with a rotational angle acquired last and stored in the RAM 1c. At step S2, a difference between the last and latest rotation angles is calculated, and the result or the displaying coordinate difference (moving speed) is stored in the RAM 1c as the moving speed of the pointer. At step S3, the displaying coordinate on the LCD panel 4 corresponding to the last rotation angle data are calculated. At step S4, the corresponding image data of the pointer are read from a ROM 1b.

At step S4A, it is judged whether the moving speed of the pointer stored at step S2 is equal or higher than a prescribed threshold value. If the answer is YES, the image color of the pointer is calculated depending on the moving speed thereof. The reduction of the image density is proportional to the moving speed of the pointer as given in Eq. (1). The image density of the pointer is thus calculated from the equation of 1−P.

At step S6, the image density of the pointer is converted to the image density to be displayed on the LCD panel. At step S7, the converted image is displayed on the LCD panel 4. If the answer at step S4A is NO, at the next step S7, the image of the pointer read at step S4 is displayed on the LCD panel 4.

In the second embodiment, when the moving speed of the pointer is equal or higher than the threshold value, the image density of the pointer is reduced by an extent according to the moving speed. The pointer moving with the high speed is displayed thinly so that the erasing time becomes shorter or the residual image remains shorter. Since the residual and latest images of the pointer are displayed thinly, the plurality of the residual images of the pointers do not give a noticeable appearance. The LCD meter apparatus thus provides a clear view. When the moving speed is lower than the threshold value, the image density of the pointer is not reduced so that the processing of the CPU becomes simple and reduces the imaging time.

The embodiments of the present invention are only exemplary but not limited thereto. Any alteration and modification thereof are within the scope of the present invention.

In the embodiments of the present invention, the image density of the pointer is reduced in accordance with the moving speed of the pointer. It is appreciated that the change of the image density includes luminance, color, and ratio of RGB.

What is claimed is:

1. A liquid crystal display (LCD) meter apparatus for displaying a dial plate and a pointer, the LCD meter apparatus comprising:
   a moving-speed calculating device for calculating a moving-speed of the pointer; and
   an image density changing device for reducing the image density of the pointer responding to the value of the moving-speed of the pointer calculated with the moving-speed calculating device, wherein
   the moving-speed of the pointer is calculated by determining a difference between a last rotation angle of the pointer and a second last rotation angle of the pointer over a specific period of time.

2. A liquid crystal display (LCD) meter apparatus for displaying a dial plate and a pointer, the LCD meter apparatus comprising:
   a moving-speed calculating device for calculating a moving-speed of the pointer;
   a decision device for determining whether the calculated value of the moving-speed of the pointer is equal or higher than a threshold value; and
   an image density changing device for reducing the image density of the pointer when the value of the moving-speed of the pointer is equal or higher than the threshold value, wherein
   the moving-speed of the pointer is calculated by determining a difference between a last rotation angle of the pointer and a second last rotation angle of the pointer over a specific period of time.

3. A liquid crystal display LCD meter apparatus for displaying a dial plate and a pointer, the LCD meter apparatus comprising:
   a moving-speed calculating device for calculating a moving-speed of the pointer; and
   an image density changing device for reducing the image density of the pointer responding to the moving-speed of the pointer calculated with the moving-speed calculating device, wherein
   the moving-speed of the pointer is calculated by determining a difference between a last rotation angle of the pointer and a second last rotation angle of the pointer and the image density changing device reduces the image density of the pointer to an extent of P=|moving speed|×K, where the K is a factor depending on a response speed of an LCD panel and image data of the pointer.

4. A liquid crystal display (LCD) meter apparatus for displaying a dial plate and a pointer, the LCD meter apparatus comprising:

a moving-speed calculating device for calculating a moving-speed of the pointer;

a decision device for determining whether the calculated moving-speed of the pointer is equal or higher than a threshold value; and an image density changing device for reducing the image density of the pointer when the moving-speed of the pointer is equal or higher than the threshold value, wherein the moving-speed of the pointer is calculated by determining a difference between a last rotation angle of the pointer and a second last rotation angle of the pointer and the image density changing device reduces the image density of the pointer to an extent of P=|moving speed|×K, where the K is a factor depending on a response speed of an LCD panel and image data of the pointer.

* * * * *